US007475407B2

(12) United States Patent
Mitsui (10) Patent No.: US 7,475,407 B2
(45) Date of Patent: Jan. 6, 2009

(54) INFORMATION PROCESSING APPARATUS AND METHOD FOR EVALUATING CONFLICT RESOLUTION RULES

(75) Inventor: Akihiro Mitsui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 716 days.

(21) Appl. No.: 10/807,102

(22) Filed: Mar. 24, 2004

(65) Prior Publication Data

US 2004/0216144 A1 Oct. 28, 2004

(30) Foreign Application Priority Data

Mar. 27, 2003 (JP) ............... 2003-089139
Mar. 16, 2004 (JP) ............... 2004-074706

(51) Int. Cl.
*G06F 9/44* (2006.01)
(52) U.S. Cl. .................. 719/321; 358/1.1; 358/1.2; 358/1.15
(58) Field of Classification Search ............... 719/310, 719/321; 707/104.1; 358/1.1, 1.15, 1.2, 358/1.16
See application file for complete search history.

(56) References Cited

U.S. PATENT DOCUMENTS

| | | | | |
|---|---|---|---|---|
| 4,896,269 A | * | 1/1990 | Tong ..................... 700/101 |
| 5,402,527 A | * | 3/1995 | Bigby et al. ............... 358/1.1 |
| 5,467,434 A | * | 11/1995 | Hower et al. ............. 358/1.15 |
| 6,067,637 A | * | 5/2000 | Auer et al. ................ 714/26 |
| 6,363,411 B1 | * | 3/2002 | Dugan et al. ............. 709/202 |
| 6,408,009 B1 | * | 6/2002 | Campbell et al. ......... 370/461 |
| 6,449,622 B1 | * | 9/2002 | LaRue et al. ............ 707/201 |
| 6,975,417 B1 | * | 12/2005 | Hilpl et al. .............. 358/1.15 |
| 7,076,778 B2 | * | 7/2006 | Brodersen et al. ......... 717/170 |
| 7,218,976 B2 | * | 5/2007 | Minagawa ................ 700/67 |
| 7,228,314 B2 | * | 6/2007 | Kawamoto et al. ....... 707/104.1 |

FOREIGN PATENT DOCUMENTS

| | | |
|---|---|---|
| JP | 2002-169669 A | 6/2002 |
| JP | 2002-196905 A | 7/2002 |
| JP | 2002-202865 A | 7/2002 |
| JP | 2002-202868 A | 7/2002 |
| JP | 2002-328757 A | 11/2002 |
| JP | 2002-328787 A | 11/2002 |
| JP | 2003-091373 A | 3/2003 |
| JP | 2003-099170 A | 4/2003 |
| JP | 2003-296063 A | 10/2003 |
| JP | 2004-005194 | 1/2004 |

* cited by examiner

*Primary Examiner*—Van H Nguyen
(74) *Attorney, Agent, or Firm*—Fitzpatrick, Cella, Harper & Scinto (57) ABSTRACT

An information processing apparatus which controls a peripheral device in accordance with set values in a device driver, comprising, a memory for holding plural conflict resolution rules to avoid a conflict among the set values in the device driver; and a processor to, in accordance with the plural conflict resolution rules read from the memory, control a status of a corresponding set value, wherein at least one of the plural conflict resolution rules includes information on application priority over other conflict resolution rules.

12 Claims, 11 Drawing Sheets

A(ON): - B(OFF). ~501
B(OFF): - C(ON). ~502

FIG. 6

A(ON): - B(OFF),wait([C]).  ~601
B(OFF): - C(ON).  ~602

```
{
    B(OFF): - C(ON).
    A(ON): - B(OFF).
}.
{
    B(ON): - D(ON).
    A(OFF): - B(ON).
}.
```

A(ON): - B(OFF).
B(OFF): - C(ON).
A(ON): - B(ON).
B(ON): - D(ON).

FIG. 11

A(ON): - B(OFF),wait([C]).
B(OFF): - C(ON).
A(ON): - B(ON),wait([C]).
B(ON): - D(ON).

INFORMATION PROCESSING APPARATUS AND METHOD FOR EVALUATING CONFLICT RESOLUTION RULES

FIELD OF THE INVENTION

The present invention relates to information processing apparatus and method, and more particularly, to information processing apparatus and method for controlling set values in a device driver.

BACKGROUND OF THE INVENTION

Many devices are controlled based on set values which are set by a user's input via a user interface (hereinafter, also abbreviated to "UI"). An image formation system (printer system) which is connected to a host computer and which performs image forming processing based on information set in the host computer is one of such devices. Generally, the host computer of the printer system has a print-related processing program including a so-called printer driver to control a printing operation and a UI to receive print settings from a user.

Every time an input of set value from the user is received via the UI, the print-related processing program evaluates the relation between the input value and a corresponding value from plural previously-set values, and determines whether or not there is a conflict between the set values. As an example of conflict, it is inconvenient for the user if double-sided printing is set when an OHP sheet is placed as a printing medium, or an operation impossible for the printer is set.

Accordingly, if a conflict exists, a conflict resolution to avoid the conflict is required.

To realize the conflict resolution, processing of conflict detection and solution is described by using a specialized program depending on the relation of set values, or conditions of plural set values requiring a conflict resolution are held in the form of list in a file such that a conflict resolution program is utilized in a general-purpose manner when the file is read by the conflict resolution program.

As to the description of conflict resolution upon storage in the file, merely rules regarding items among the set values are described. When plural rules are described, they are processed in order of description not directly related to the conflict resolution. Further, in a case where set values changed by a conflict resolution are further changed by the conflict resolution, since the order of rules to determine the set values cannot be clearly defined, the order of interpretation of the conflict resolution program is found in trial-and-error manner by repetition of describing and execution. Thus erroneous determination and the number of steps are increased.

SUMMARY OF THE INVENTION

The one of the aspect of the present invention has its object to improve the description structure of conflict resolution rules for a user interface so as to reduce a developer's mistakes and the number of steps.

The above object is attained in information processing apparatus, program and method according to the present invention. According to the information processing apparatus, program and method, an extraction unit is configured to extract a conflict resolution rule from the head of a queue; a determination unit is configured to determine whether or not a predetermined control symbol is included in the conflict resolution rule extracted by the extraction unit, wherein the control symbol indicates information on priority of application of the conflict resolution rule over other rules; and a processing unit is configured to, if it is determined by the determination unit that the control symbol is included in the conflict resolution rule extracted by the extraction unit, remove the control symbol from the conflict resolution rule and insert the conflict resolution rule from which the control symbol is removed into the end of the queue, and if it is determined by the determination unit that the control symbol is not included in the conflict resolution rule extracted by the extraction unit, evaluate the conflict resolution rule extracted by the extraction unit.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
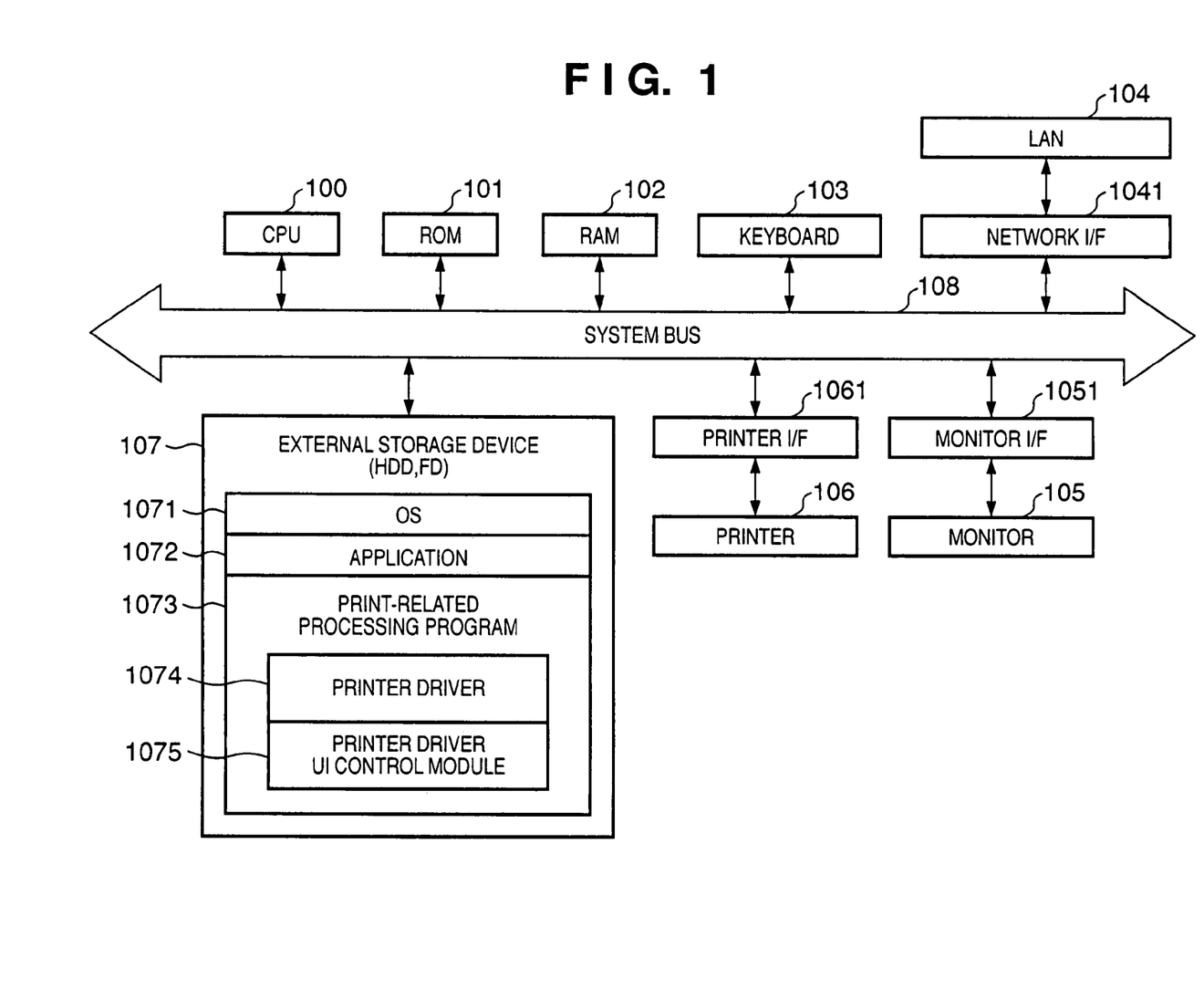
FIG. 1 is a block diagram of a print processing system according to an embodiment.

FIG. 1 is a block diagram showing a print processing system according to an embodiment of the present invention. Note that unless particularly described, the present invention is applicable to a single device, a system including plural devices, or a system where processing is performed through connection via a network such as a LAN or WAN, as long as the functions of the present invention are performed.

FIG. 1 shows an example of print processing system using a general computer. A CPU 100 controls the overall apparatus in accordance with programs stored in a ROM 101, a RAM 102 or an external storage device 107. The RAM 102 is used as a work area upon execution of various processings by the CPU 100.

The external storage device 107, realized with a hard disk device or the like, holds an operating system (OS) 1071, application software 1072, and a print-related processing program 1073. The print-related processing program 1073 includes a printer driver 1074 and a printer driver UI control module 1075.

An input device such as a keyboard 103 or a mouse (not shown) is a device for a user to input various instructions. A network I/F 1041 serves as an interface for connection with a LAN 104 or a network (not shown) and data transmission/reception. A monitor I/F 1051 serves as an interface for connection with a monitor 105 and data transmission/reception. A printer I/F 1061 serves as an interface for connection with a printer 106 as a device to be controlled and data transmission/reception. Further, reference numeral 108 denotes a common data bus. Note the printer 106 is an example of device to be controlled. The present invention is applicable to a scanner or the like as a device to be controlled.

Figure 2:
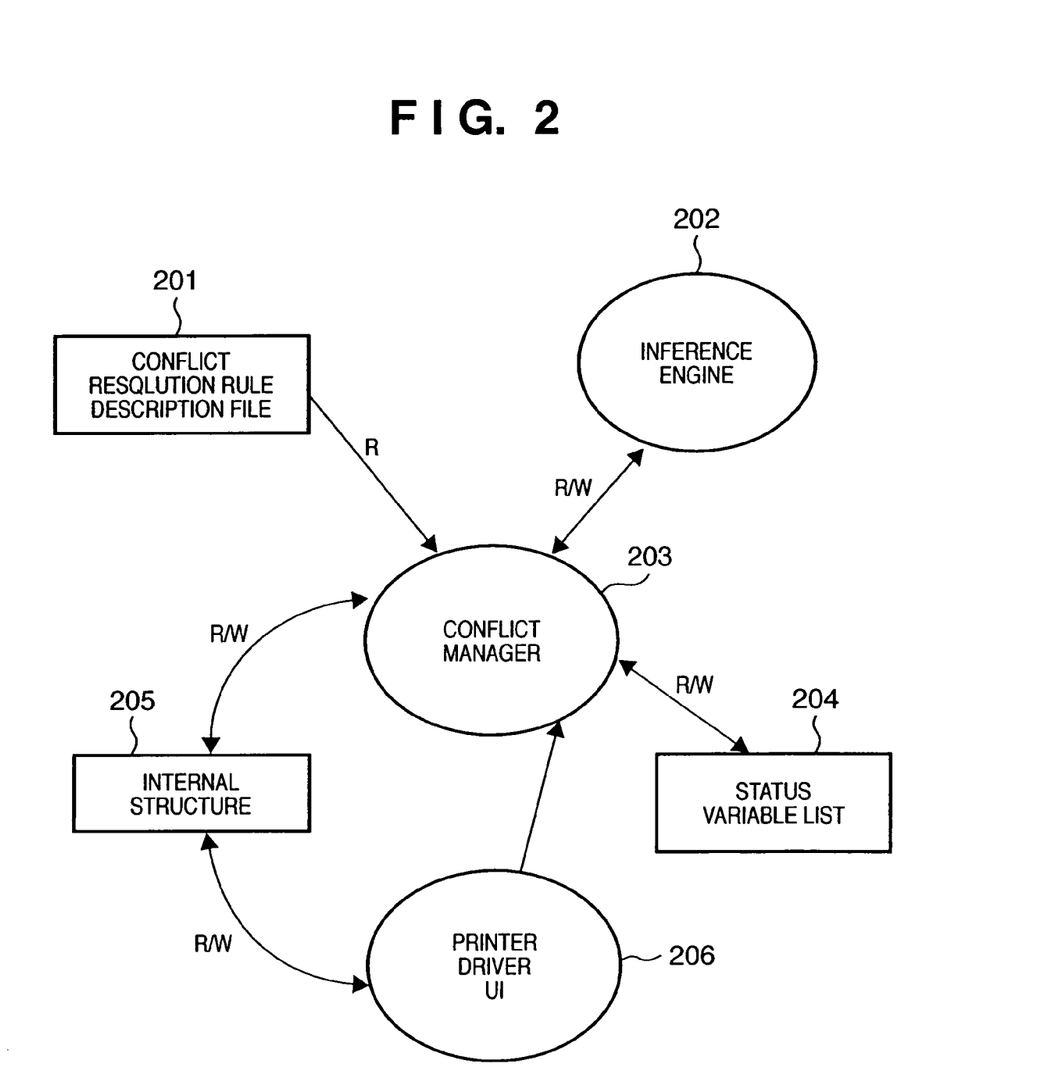
FIG. 2 is a block diagram showing a functional structure of a printer driver UI control module according to the embodiment.

FIG. 2 shows the functional construction of a printer driver UI control module 1075 in the print-related processing program 1073. Numeral 203 denotes a conflict manager which manages data delivery among respective modules and data update thereby generally manages a conflict resolution; numeral 206 denotes a printer driver UI which performs display control of a print setting screen image; numeral 201 denotes a conflict resolution rule description file where plural conflict resolution rules are described, to avoid unconformity among set values inputted via the printer driver UI 206; numeral 202 denotes an inference engine which applies the conflict resolution rules to an input set value and infers the statuses of respective functions; numeral 204 denotes a status variable list showing the statuses of respective printer functions in the form of list, which is updated based on the user's input and the contents of the conflict resolution rule description file 201; and numeral 205 denotes an internal structure which is a form as a basis of screen image display provided by the printer driver UI 206, which displays the statuses of the respective printer functions in a predetermined format in correspondence with the status variable list 204.

When the conflict manager 203 receives a setting information from the user via the printer driver UI 206, the conflict manager 203 refers to the conflict resolution rule description file 201. In FIG. 2, this operation is indicated as "R (Read)" with an arrow from the conflict resolution rule description file 201 to the conflict manager 203. As a result of reference, if the setting information corresponds to the conflict resolution rule, a conflict resolution is applied. The conflict manager 203 updates the status variable list 204 and the internal structure 205 and causes the printer driver UI 206 to reflect the update. As shown in FIG. 2, the updating is indicated as "R/W (Read/Write)" with bidirectional arrows between the conflict manager 203, and the status variable list 204 and the internal structure 205.

Figure 3:
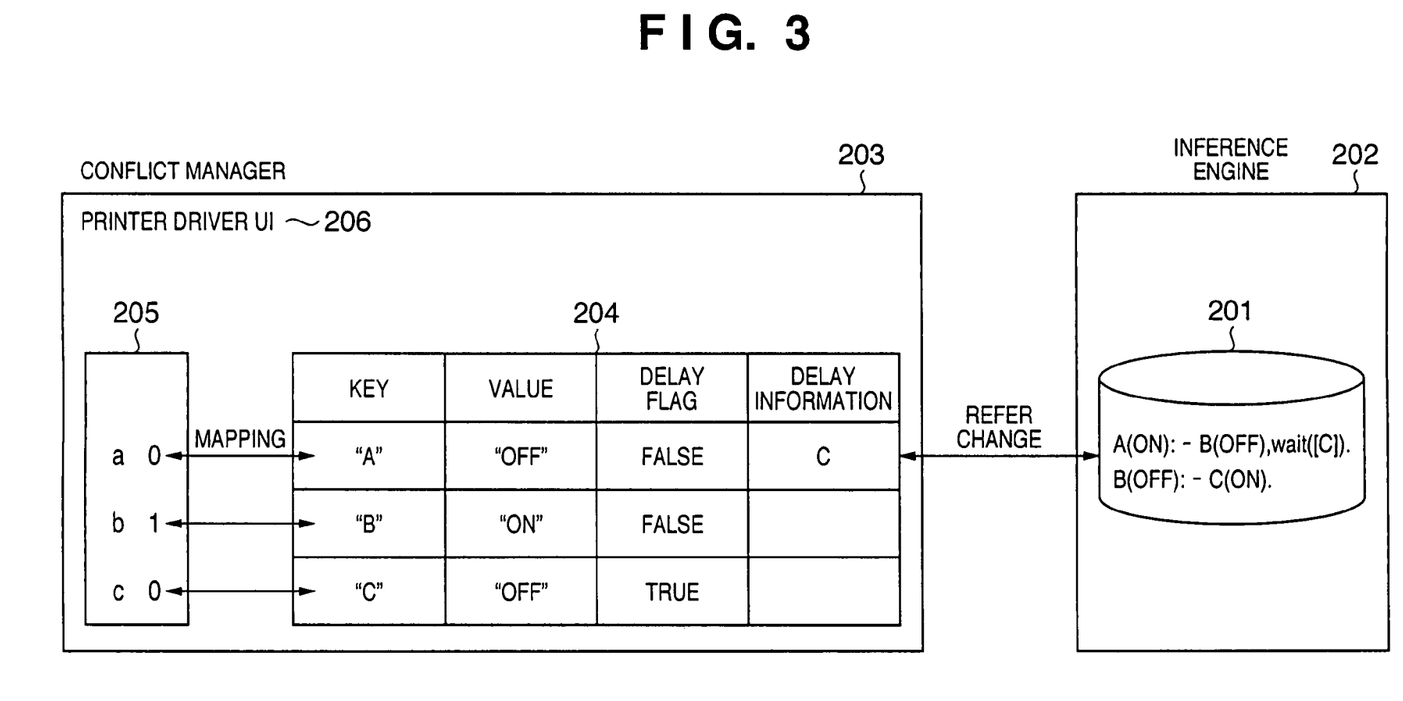
FIG. 3 is an explanatory diagram showing the relation of data in a conflict resolution according to the embodiment.

FIG. 3 is an explanatory diagram showing the relation of data handled in the respective modules in FIG. 2. In FIG. 3, the conflict resolution rule description file 201 is referred to in a state where it is included (loaded) in the inference engine 202. The conflict resolution rule description file 201 is also referred to by the conflict manager 203, and in response to the referred contents of the conflict resolution rule description file 201, the status variable list 204 is updated. Further, as the internal structure 205 and the status variable list 204 are interlocked with each other for the display control as described above, they are mapped from each other. This status is represented in visible form for the user under the control of the printer driver UI 206.

Figure 4:
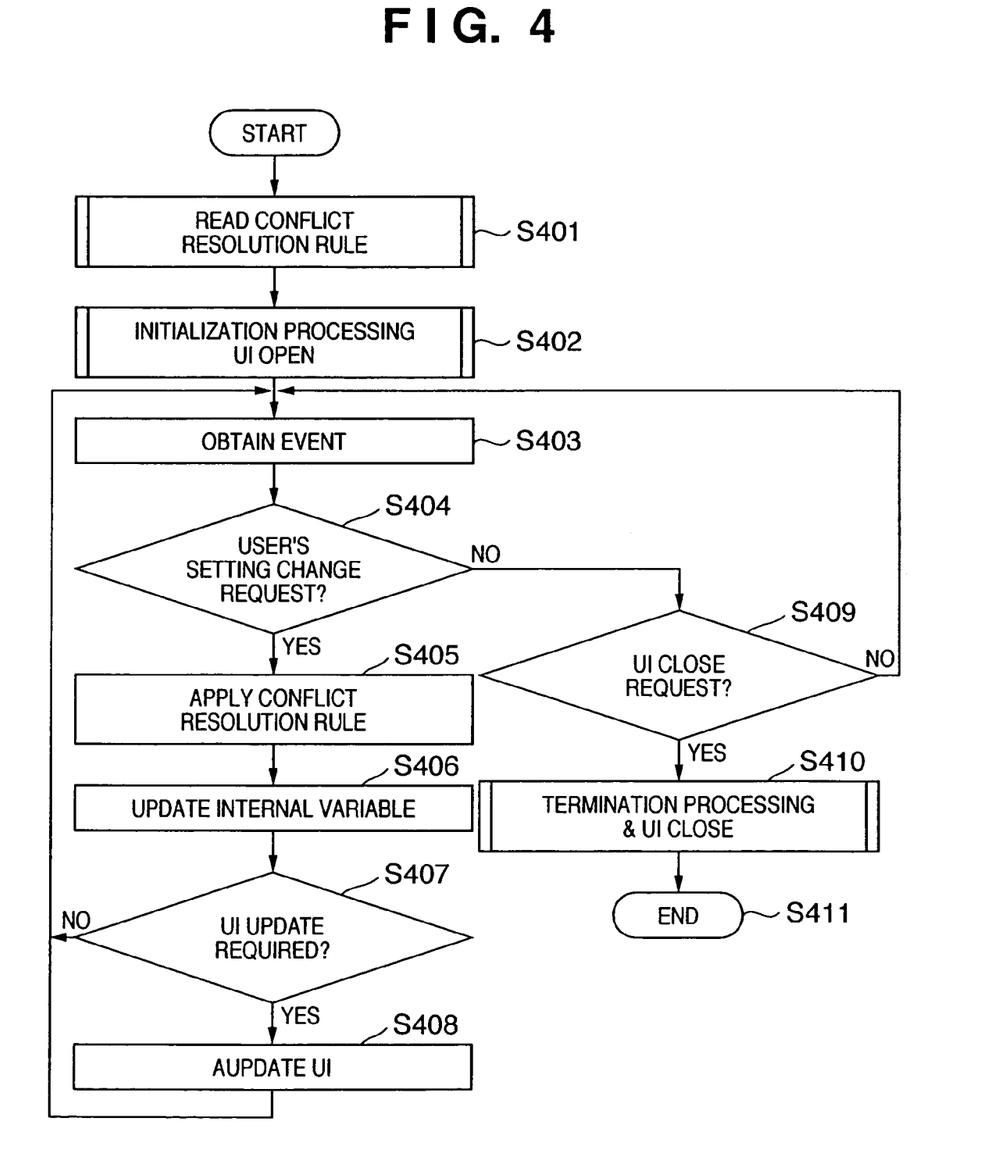
FIG. 4 is a flowchart showing an application procedure of conflict resolution rules according to the embodiment.

FIG. 4 is a flowchart showing an application procedure of conflict resolution rule according to the embodiment. As an example, described here is a conflict resolution performed on a printer driver UI displayed by the printer driver 1074 on the monitor 105 for various settings to control the printer 106.

Figure 6:
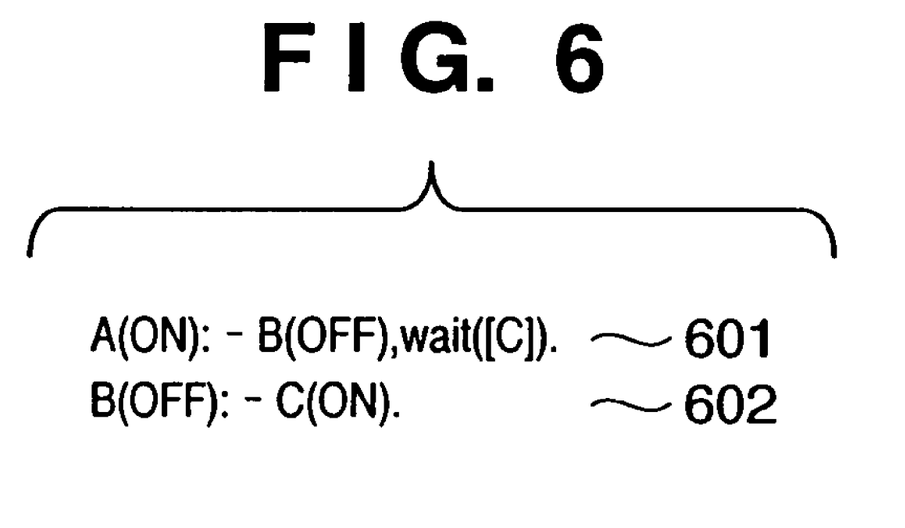
FIG. 6 is an example of a description of conflict resolution rules including a control command related to the rule application order.

The solution shown in FIG. 4 starts by the user's instruction from the keyboard 103 or the like to open the printer driver UI on the OS or application. By this user's instruction to open the printer driver UI, the print-related processing program 1073 is loaded into the RAM 102 under the management of the OS 1071. When the print-related processing program 1073 has been loaded into the RAM 102, first, initialization processing to open the printer driver UI is performed. The inference engine 202 reads the conflict resolution description file 201 as shown in FIG. 6 via the conflict manager 203 into the RAM 102 (step S401).

The respective rules described in the conflict resolution rule description file 201 are mathematically formalized by using logics. A predicate is described as "printer function name (argument)". As an argument, ON/OFF and a numerical value (e.g., the number of print copies) is used. In the present specification, a function to represent a current status by the content of argument is called a "status variable". That is, each rule is described as a logical expression using a "status variable". More specifically, the "printer function (argument)" is described in the left side, a logical condition for establishment of the left side is described in the right side, and a symbol ":-" links the both sides to each other. For example,

A(ON):-B(ON).

means a rule that "if the status of printer function B is ON, the status of printer function A is turned ON".

Further, a symbol "," in an expression is used as "AND". For example, a rule that "if the status of printer function B is ON and the status of printer function C is OFF, the status of printer function A is turned ON" is described as:

A(ON):-B(ON), C(OFF).

Next, it is assumed that the following conflict resolution rule is described in the conflict resolution rule description file 201.

A(ON):-B(ON), C(OFF).

As shown in FIG. 3, the printer functions A, B and C described in the conflict resolution rule description file 201 are described as status variables in a "key" column of the status variable list 204. Further, current values of the respective status variables (ON/OFF) are described in a "value" column. In this example, members of the internal structure 205 of the printer driver UI corresponding to the printer functions A, B and C are represented as a, b and c. The internal structure 205 has initial values inside or outside, and the values of status variables depend on the initial values of the respective members of the internal structure 205. As the initial value of the member a is 0, the value of the status variable A is OFF.

Further, as shown in FIG. 3, the status variable list 204 has a delay flag and delay information related to the order of application of the respective rules to be described later, such that regarding each rule, delay information if exists is stored. The details of the delay information will be described later.

The inference engine 202 receives the conflict resolution rule description file 201 from the conflict manager 203, then infers the status variables and evaluates the conflict resolution rules. If the value of the status variable B is ON and that of the status variable C is OFF, an evaluation of the right side of the conflict resolution rule is established, and the value of the status variable A in the left side is changed to ON. When the inference of the conflict resolution rule has been completed, the conflict manager 203 performs control such that the value of the changed status variable is reflected in the corresponding member a of the internal structure 205 of the printer driver UI. That is, as the value of the status variable A has changed from OFF to ON, the member a of the internal structure 205 is changed from 0 to 1 in response to the establishment of the above conflict resolution rule.

Further, a status variable for temporary storage of value, as well as a status variable linked to a printer function, can be described in a conflict resolution rule. The status variable for temporary storage of value is stored inside the inference engine 202 during a period from the start to the end of conflict resolution by the inference engine 202 in accordance with a conflict resolution rule. As this status variable is a temporary variable, it is volatile data which disappears upon completion of the conflict resolution.

As a method of describing a temporary status variable, a key name which does not exist in the status variable list 204 is described as a status variable in a conflict resolution rule, the inference engine 202 performs solution with this variable as a temporary status variable. As an initial value of the temporary status variable cannot be determined, the initial value when the variable is generated is an inconstant value.

The temporary status variable can be utilized in a case where the status of conflict resolution is to be memorized in the middle of complicated conflict resolution, or can be utilized upon establishment of the relation between one-to-many conflict resolution rules.

Figure 9:
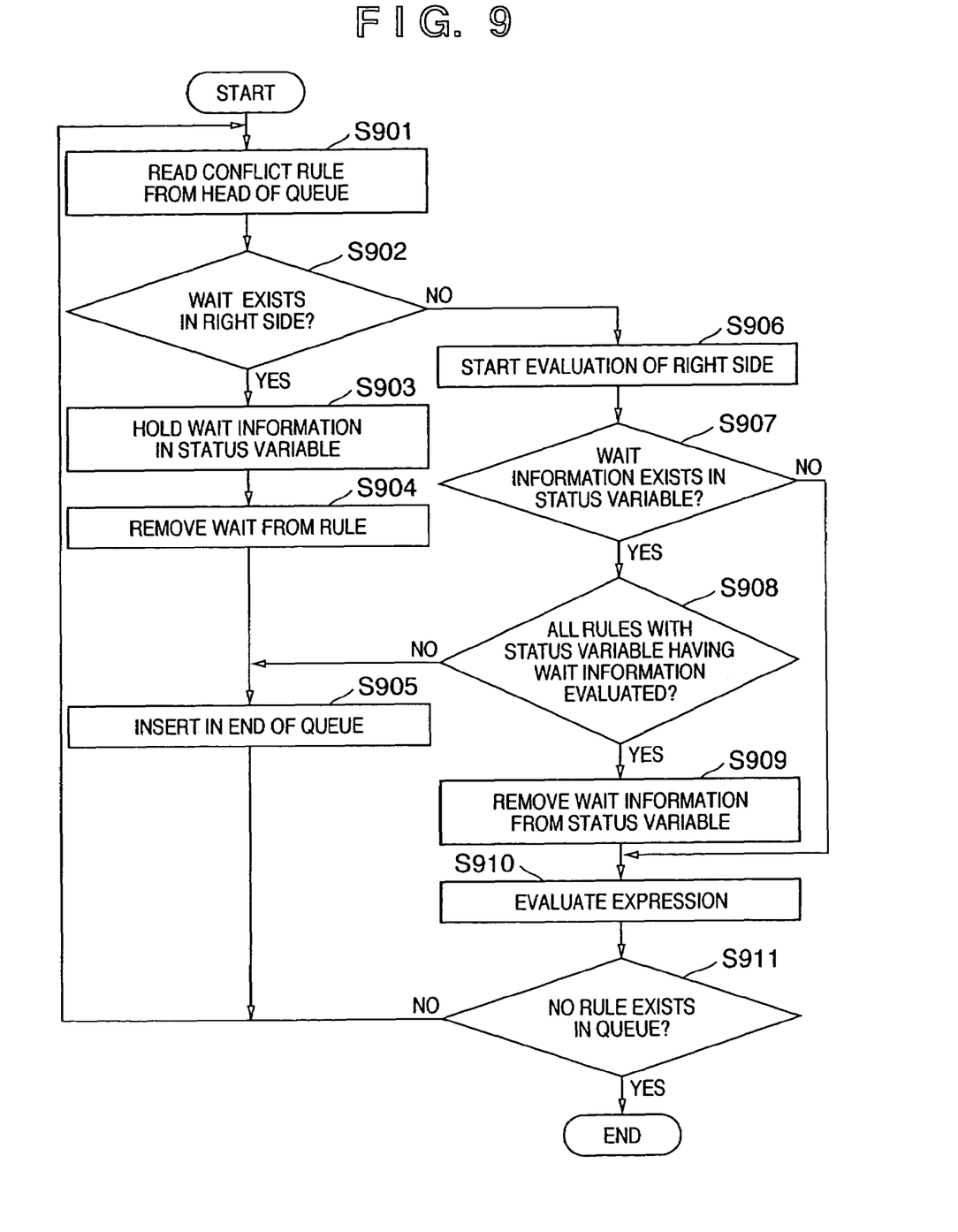
FIG. 9 is a flowchart showing processing of reading a conflict resolution rule description file according to the embodiment.

In a case where conflict resolution rules as shown in FIG. 6 are described in the conflict resolution rule description file 201, and the conflict manager 203 forwards the rules to the inference engine 202, the inference engine 202 adds the conflict resolution rule description file 201 to a queue of the engine itself in described order, and starts evaluation in accordance with the flowchart of FIG. 9.

The inference engine 202 reads a conflict resolution rule from the head of its queue (step S901). That is, first, a rule 601 in FIG. 6, A(ON):-B(OFF), wait([C]).

is read out.

Next, it is determined whether or not a control symbol "wait" is included in the right side of the read rule (step S902). The control symbol "wait" indicates information on priority of application of the rule over other rules. The rule 601 includes the control symbol "wait". If the control symbol "wait" is included in the right side in this manner, the delay flag in the status variable list 204 for the status variable C designated with the control symbol "wait" is set to "TRUE", and "C" is described as the delay information for the status variable A of the left side (step S903). Thus it is indicated that the status variable A is waiting for the evaluation of the status variable C.

Next, a rule excluding "wait" is generated from the right side (step S904). That is, from the rule 601,

A(ON):-B(OFF). (603)

is generated. Then the rule 603 is inserted in the end of the queue (step S905).

Thereafter, the process returns to step S901, at which the next conflict resolution rule, that is, a conflict resolution rule 602,

B(OFF):-C(ON).

is read from the queue, and it is determined at step S902 whether or not the control symbol "wait" is included in the right side. In this case, as the control symbol "wait" is not included in the right side, the process proceeds to step S906, at which the right side is evaluated. The inference engine 202 determines whether or not delay information of the status variable B in the left side is linked to the status variable C (step S907). However, in this example, as no delay information for the status variable C exists in the status variable B in the left side of the rule 602, the process proceeds to step S910, at which the expression is evaluated. The inference engine 202 evaluates the expression, then inquires about the value of the status variable C from the conflict manager 203, and if the value of the status variable C is ON, changes the value of the status variable B to OFF. Then, the delay flag for the status variable C is set to "FALSE" so as to indicate the completion of processing regarding the status variable C.

At step S911, it is checked whether or not the queue has a rule. If there is no rule in the queue, the process ends. In this example, as the rule 603 generated by excluding the control symbol "wait" from the rule 601 has been inserted into the end of the queue at step S905, the process returns to step S901 at which the rule 603 is read out. In this case, as the control symbol "wait" does not exist in the right side of the rule 603, the process proceeds from step S902 to step S906, at which the evaluation of the right side is started. At step S907, it is determined whether or not delay information in the status variable A in the left side is linked to the status variable C. In this example, as the delay information of the status variable A in the left side of the rule 601 has been linked to the status variable C at previous step S903, the process proceeds to step S908.

At step S908, it is determined whether or not all the rules including the control symbol "wait" have been evaluated. That is, it is checked whether or not the status variable C of the delay information linked to the status variable A has been evaluated. If it is determined that all the rules have not been evaluated, the process proceeds to step S905. In this example, as the delay flag for the status variable C is changed to "FALSE" at step S910, it is determined that all the rules have been evaluated, and the process proceeds to step S909. At step S909, the delay information of the status variable A is deleted, and thereafter, the expression is evaluated at step S910.

Note that depending on the order of description of the conflict resolution rules or evaluation process, it cannot be determined at step S908 that all the evaluation of the status variable C without "wait" has been completed. In such case, the process enters an infinite loop and cannot end. Accordingly, it is preferable that the number of returns to step S901 without step S910 is counted, and when the count value exceeds a predetermined number, waiting processing is abandoned and the process forcibly proceeds from step S907 to step S910, thereby the entrance into an infinite loop is prevented.

Figure 5:
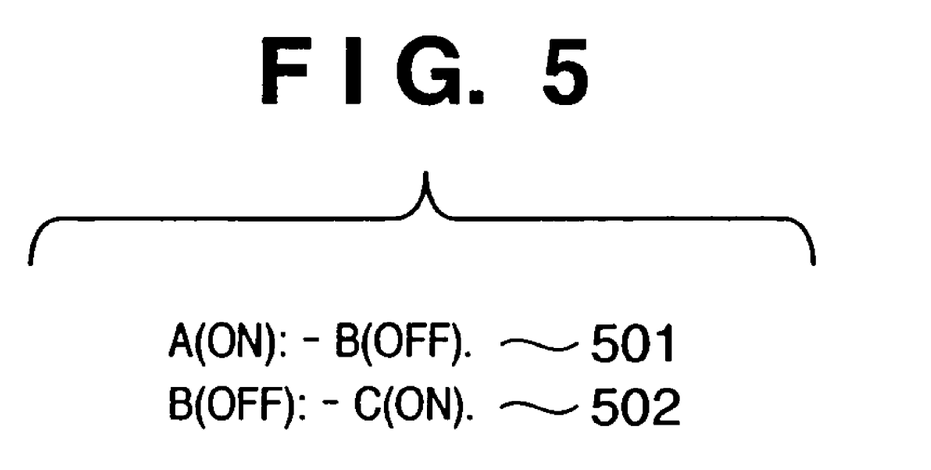
FIG. 5 is an example of a description of conflict resolution rules including no control command related to a rule application order.

If a comparison is made between the example of conflict resolution rules in FIG. 5 and that in FIG. 6, the difference is that, in FIG. 5, if the rules are evaluated in order of description, the value of the status variable A when the status variable B is ON is different from that when the status variable B is OFF, whereas in FIG. 6, as the rule application order is controlled by the description of the control symbol "wait", the status variable A can be prevented from becoming an inconstant value.

Figure 7:
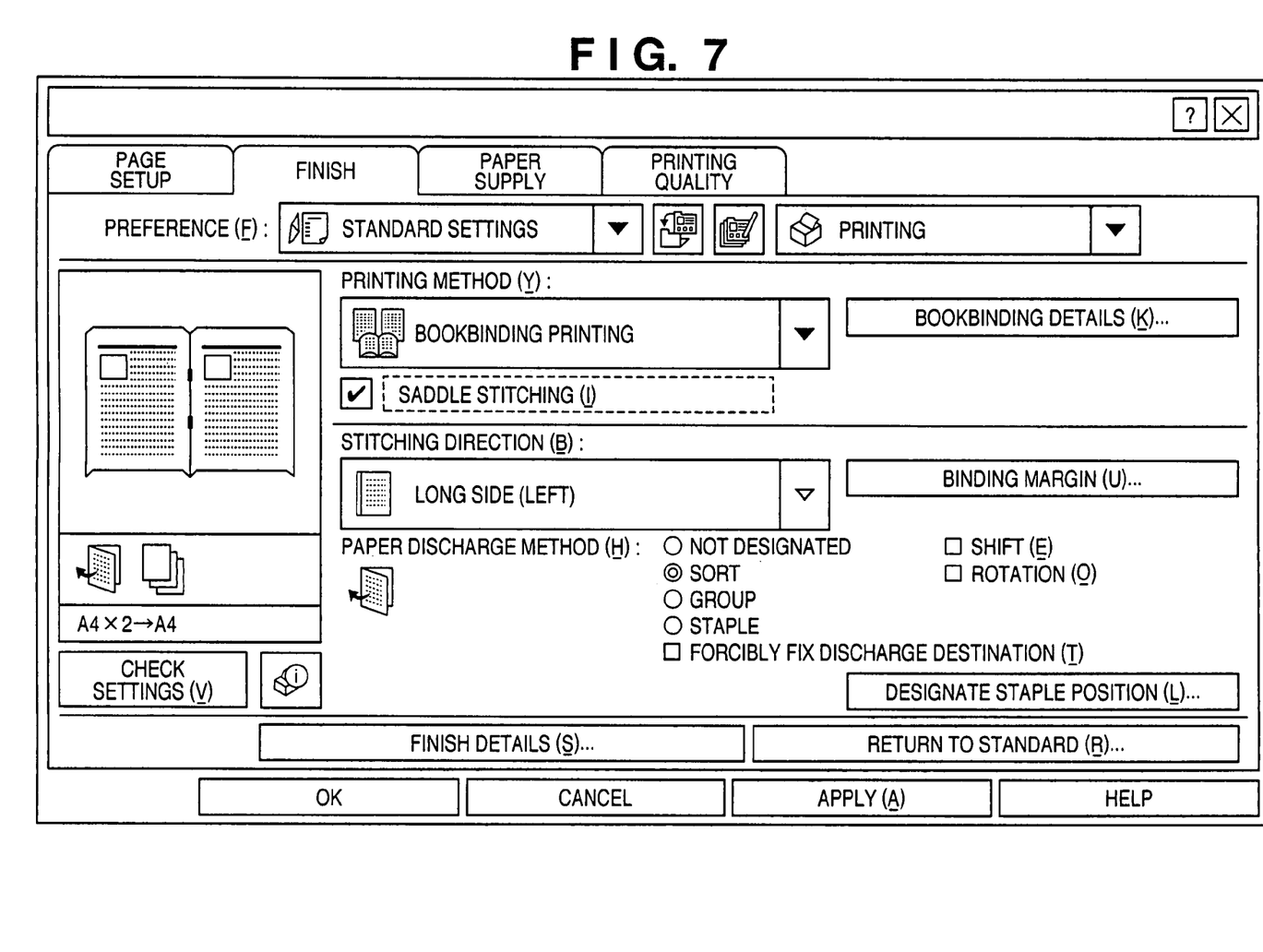
FIG. 7 is an example of a printer driver UI according to the embodiment.

When there is no conflict resolution rule as a result of the above-described processing, a printer driver UI as shown in FIG. 7 is opened (step S402).

When the printer driver UI has been opened, acquisition of an event sent from the OS (step S403) and processing thereof is repeated. At step S404, it is determined whether or not the event obtained at step S403 is the user's change of a setting item on the printer driver UI. If it is determined that the event is the user's request for change of a setting item, the member of the internal structure corresponding to the setting item is changed by the conflict manager, then the corresponding status variable is changed by the conflict manager, and the inference engine performs the above-described conflict resolution based on the conflict resolution rules (step S405).

Then, when there is no conflict resolution rule, the conflict manager applies all the status variables changed by the conflict resolution to the corresponding members of the internal structure (step S406). The conflict manager determines from the changed members of the internal structure whether or not the UI must be updated (step S407). If it is not necessary to update the UI, the process returns to step S403, while if it is necessary to update the UI, UI update processing is performed (step S408), and the process returns to step S403.

Further, if it is determined at step S404 that the event is not the user's request for change of a setting item, the process proceeds to step S409, at which it is determined whether or not the event is the user's request for closing the printer driver UI. If the event is a close request, the printer driver UI is closed, then termination processing is performed (step S410), the process ends (step S411), otherwise, the process returns to step S403 to repeat the processing.

The above processing is repeatedly performed until the printer driver UI is closed by the user. When the printer driver UI has been closed, all the processing is terminated, and the processing of the print-related processing program according to the present embodiment ends, then deleted from the RAM 103 by the function of the OS 1071. The internal structure 205 used by the printer driver UI is reflected in the printer 106 or the OS 1071 and used upon the user's printing instruction to the printer 106.

Note that in the present embodiment, the medium storing the print-related processing program is the external storage device 107, however, the external storage device may be an FD, an HDD, an optical disk medium, an IC memory card or the like. Further, it may be arranged such that only the print-related processing program, or the print-related processing program with another program to operated on the OS or the computer, is recorded in the ROM 101 as a part of a memory map, and directly executed by the CPU 100.

Figure 8:
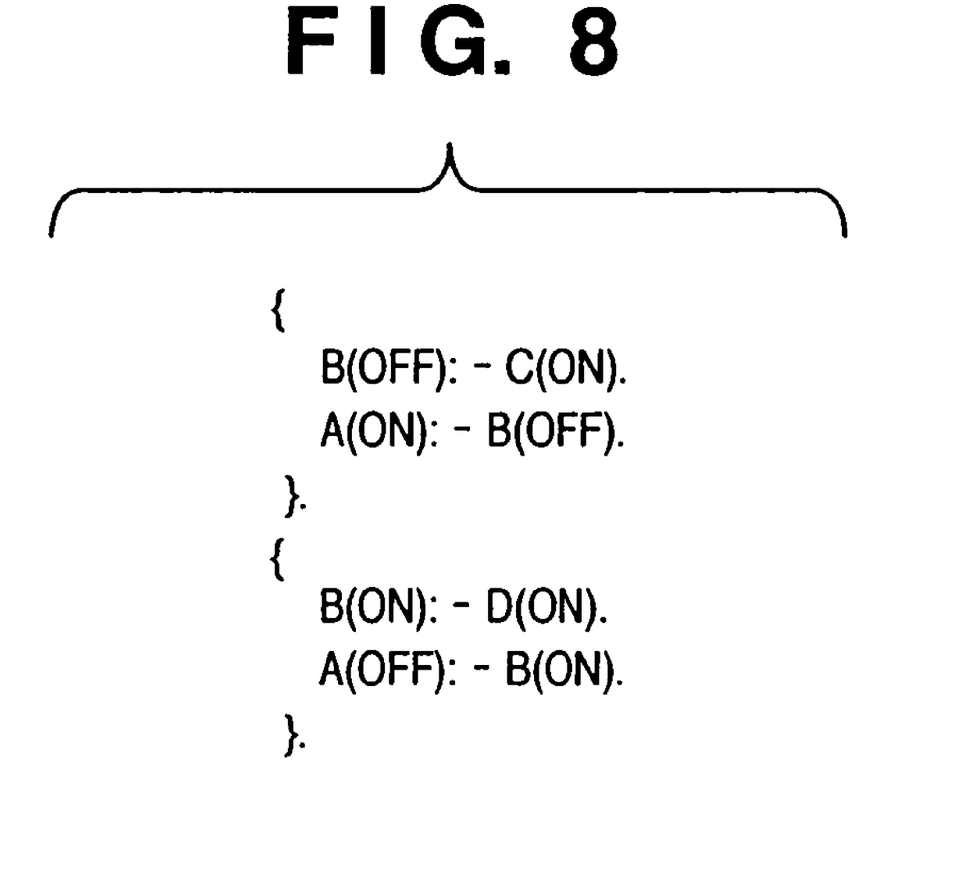
FIG. 8 is an example of a description of conflict resolution rules to which a scope is applied.

Further, in the above-described embodiment, the waiting of conflict resolution rule is realized by adding one rule. Further, as shown in FIG. 8, the waiting may be realized with a scope "{", "}" including a series of plural conflict resolution rules, indicating that the rules and status variables interfere with each other in the group and any evaluation is not performed without the group. For example, when the inference engine 202 detects the start of scope, adds scope numbers to conflict resolution rules described in the scope and insert them into the queue upon each appearance of scope. To evaluate the conflict resolution rules in the scope, if a conflict resolution rule having the description of order in the scope exits, the engine performs evaluation in accordance with the order, while if such rule does not exist, performs evaluation in order of description of the scope. As each conflict resolution rule has a scope number, when one conflict resolution rule is evaluated, the inference engine does not evaluate another rule with another scope number even if it is read out from the queue. Thus the priority order is established.

According to the above-described embodiment, as the inference engine can evaluate the conflict conditions generated with conflict resolution rules prepared by a program developer or the like in a regular order, the result of operation by the inference engine can be easily represented and high quality conflict resolution can be realized.

Figure 10:
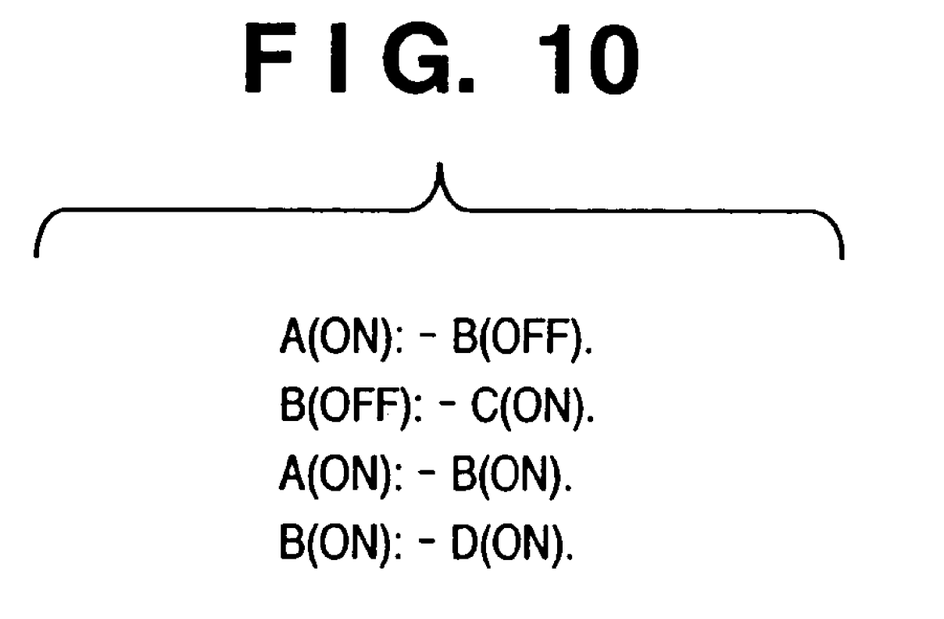
FIGS. 10 and 11 are examples showing the effect of control symbols related to the rule application order.
Figure 11:
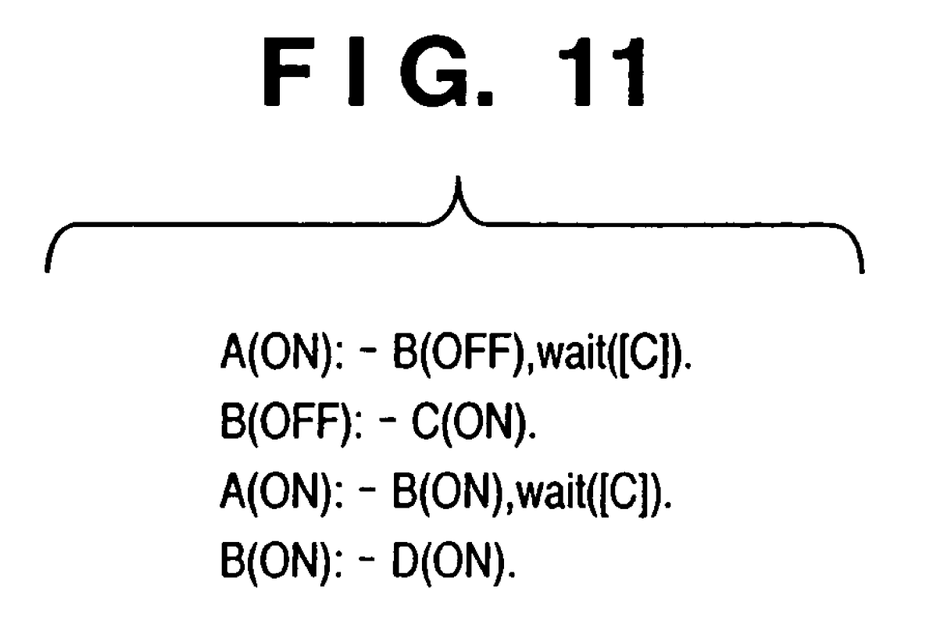

Further, the conventional problem that the result changes depending on the order of evaluation of conflict resolution rules can be prevented. For example, if a comparison is made between conflict resolution rules in FIG. 10 and those in FIG. 11, although the contents of the rules are similar to each other, the difference is that the control symbol "wait" related to application order is described in the first and third rules in FIG. 11. In FIG. 10, if the status variables C and D are ON, the status variable B first becomes ON or OFF depending on the evaluation. As a result, the first ON/OFF of the status variable A depending on the status variable B by the first and third rules cannot be determined. This is an example where the program developer cannot allocate a conflict resolution in an intended direction. On the other hand, in FIG. 11, as the first rule is linked to the rule for the status variable C and the third rule is linked to the rule for the status variable D, the status variables A and B can be changed in an intended order.

Next, a description will be made about an example where the use of the control symbol "wait" prevents the conventional problem that the result is changed by the order of evaluation of conflict resolution rules. In this example, the following conflict resolution rules are generated.

$TEMP(OFF):-Layout$Printing(BOOKLET).     (1)

$TEMP2(OFF):-$TEMP(OFF).     (2)

$TEMP3(OFF):-$TEMP2 (OFF).     (3)

Layout$Scaling(OFF):-Layout$Printing(TWO-SIDED).     (4)

Layout$Scaling(OFF):-$TEMP3(OFF).     (5)

These conflict resolution rules are generated based on a specification that when bookbinding (BOOKLET) or double-sided printing (TWOSIDED) is selected as a printing method (Printing), a print data scaling function is turned OFF.

In this example, a status variable beginning with "$" is a temporary status variable, and a status variable beginning with "Layout$" is a status variable linked to an actual printer function. Although the same printing is to be performed in the bookbinding printing and the double-sided printing, the difference is that the temporary variable is used in the bookbinding.

In a case where the conflict resolution is started upon the user's selection of bookbinding printing, it is understood from the specification that the confliction solution rules are to be evaluated in the order (1)→(2)→(3)→(4)→(5). First, when bookbinding printing has been selected, the rule (1) is established, and the temporary status variable $TEMP becomes OFF. Next, as the variable $TEMP is OFF, the rule (2) is established, and the variable $TEMP2 becomes OFF. Then, as the variable $TEMP2 is OFF, the rule (3) is established, and the variable $TEMP3 becomes OFF. Next, the rule (4) is evaluated. As the printing method is bookbinding, the rule (4) is not established. Then the rule (5) is evaluated, and the print data scaling function is OFF.

However, as the inference engine infers the status variables in actual operation, the rules are not necessarily evaluated from the rule (1) to the rule (5). The inference of status variable is deriving a conflict rule related to change of the value of status variable from the rules, then first evaluating the related conflict rule, thereby omitting the order of processing (labor) to evaluate all the conflict resolution rules upon each change of value and preventing entrance of infinite loop.

Accordingly, it is conceivable that the evaluation is made in an order (1)→(2)→(4)→(5)→(3) when bookbinding printing is selected. In this case, at the timing of evaluation of the rule (5), the value of the variable $TEMP3 is not OFF and in inconstant state as an initial value of temporary status variable. Accordingly, the evaluation of the rule (5) fails, and the scaling cannot be OFF.

In this case, the function of the control symbol "wait" is used. That is, the rule (5) is rewritten as follows:

Layout$Scaling(OFF):-$TEMP3(OFF), wait ([$TEMP3]). (5')

Even if the rule (5') is evaluated prior to the evaluation of the conflict resolution rule (the rule (3)) related to the variable $TEMP3, the rule is inserted into the end of the queue before the conflict resolution rule regarding the $TEMP3 is evaluated, it is not actually evaluated prior to the evaluation of the rule (3).

In this manner, as the order of the conflict resolution rules is determined, addition and deletion of rule to/from currently existing conflict resolution rules can be easily made.

Further, in a case where user interface update processing and message processing are added to conflict resolution rules, it is possible for a developer to realize low-maintenance coding with high readability. Further, upon customization of only a part of driver conflict resolution, the customization can be made without any change of coding for the user interface. At this time, if combined with the present invention, conflict resolution rules can be easily described without deep understanding of the operation of inference engine and an expected result can be obtained.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:
a Central Processing Unit (CPU);
a memory coupled to the CPU;
a display unit configured to display a plurality of print settings on a print setting screen;
an extraction unit configured to extract from a head portion of a queue, a conflict resolution rule for avoiding a conflict among the print settings displayed on the print setting screen;
a determination unit configured to determine whether a predetermined control symbol is included in the conflict resolution rule extracted by said extraction unit, wherein the control symbol indicates information on priority of application of the conflict resolution rule over other rules; and
a processing unit configured to, if it is determined by said determination unit that the control symbol is included in the conflict resolution rule extracted by said extraction unit, remove the control symbol from the conflict resolution rule and insert the conflict resolution rule from which the control symbol is removed into an end portion of the queue, and, if it is determined by said determination unit that the control symbol is not included in the conflict resolution rule extracted by said extraction unit, evaluate the conflict resolution rule extracted by said extraction unit,
wherein said processing unit is configured to, if it is determined in said determination unit that the control symbol is included in the conflict rule extracted by said extraction unit, describe delay information in a status variable, remove the control symbol from the conflict resolution rule and insert the conflict resolution rule from which the control symbol is removed into the end portion of the queue, and, if it is determined by said determination unit that the control symbol is not included in the conflict resolution rule extracted by said extraction unit, evaluate the conflict resolution rule extracted by said extraction unit after all status variables to have described therein the delay information are processed.

2. The apparatus according to claim 1, further comprising an updating unit configured to update a user interface of a printer driver based on an evaluation result of the conflict resolution rule by said processing unit.

3. The apparatus according to claim 1, wherein the control symbol is applied to a conflict rule including a temporary status variable.

4. An information processing apparatus comprising:
a Central Processing Unit (CPU);
a memory coupled to the CPU;
an extraction unit configured to extract a conflict resolution rule from a head portion of a queue;
a determination unit configured to determine whether a predetermined control symbol is included in the conflict resolution rule extracted by said extraction unit, wherein the control symbol indicates information on priority of application of the conflict resolution rule over other rules; and
a processing unit configured to, if it is determined by said determination unit that the control symbol is included in the conflict resolution rule extracted by said extraction unit, remove the control symbol from the conflict resolution rule and insert the conflict resolution rule from which the control symbol is removed into an end portion of the queue, and, if it is determined by said determination unit that the control symbol is not included in the conflict resolution rule extracted by said extraction unit, evaluate the conflict resolution rule extracted by said extraction unit,
wherein said processing unit is configured to, if it is determined in said determination unit that the control symbol is included in the conflict rule extracted by said extraction unit, describe delay information in a status variable, remove the control symbol from the conflict resolution rule and insert the conflict resolution rule from which the control symbol is removed into the end portion of the queue, and, if it is determined by said determination unit that the control symbol is not included in the conflict resolution rule extracted by said extraction unit, evaluate the conflict resolution rule extracted by said extraction unit after all status variables to have described therein the delay information are processed, and
wherein said processing unit is further configured to count a number of times that the status variables described therein the delay information are processed, and forcefully evaluate the conflict resolution rule extracted by said extraction unit when a count value exceeds a predetermined number.

5. An information processing method performed by a computer, the method comprising:
a print setting display step of displaying a plurality of print settings on a print setting screen;
an extraction step of extracting, from a head portion of a queue, a conflict resolution rule for avoiding a conflict among the print settings displayed in the print setting display step;
a determination step of determining whether a predetermined control symbol is included in the conflict resolution rule extracted in said extraction step, wherein the control symbol indicates information on priority of application of the conflict resolution rule over other rules; and
a processing step of, if it is determined in said determination step that the control symbol is included in the conflict resolution rule extracted in said extraction step, removing the control symbol from the conflict resolution rule and inserting the conflict resolution rule from which the control symbol is removed into an end portion of the queue, and, if it is determined in said determination step that the control symbol is not included in the conflict resolution rule extracted in said extraction step, evaluating the conflict resolution rule extracted in said extraction step,
wherein said processing step, if it is determined in said determination step that the control symbol is included in the conflict rule extracted in said extraction step, describes delay information in a status variable, removes the control symbol from the conflict resolution rule and inserts the conflict resolution rule from which the control symbol is removed into the end portion of the queue, and, if it is determined in said determination step that the control symbol is not included in the conflict resolution rule extracted in said extraction step, evaluates the conflict resolution rule extracted in said extraction step after all status variables to have described therein the delay information are processed.

6. The method according to claim 5, further comprising an updating step of updating a user interface of a printer driver based on an evaluation result of the conflict resolution rule in said processing step.

7. The method according to claim 5, wherein the control symbol is applied to a conflict rule including a temporary status variable.

8. An information processing method performed by a computer, the method comprising:
an extraction step of extracting a conflict resolution rule from a head portion of a queue;
a determination step of determining whether a predetermined control symbol is included in the conflict resolution rule extracted in said extraction step, wherein the control symbol indicates information on priority of application of the conflict resolution rule over other rules; and
a processing step of, if it is determined in said determination step that the control symbol is included in the conflict resolution rule extracted in said extraction step, removing the control symbol from the conflict resolution rule and inserting the conflict resolution rule from which the control symbol is removed into an end portion of the queue, and, if it is determined in said determination step that the control symbol is not included in the conflict resolution rule extracted in said extraction step, evaluating the conflict resolution rule extracted in said extraction step,
wherein said processing step, if it is determined in said determination step that the control symbol is included in the conflict rule extracted in said extraction step, describes delay information in a status variable, removes the control symbol from the conflict resolution rule and inserts the conflict resolution rule from which the control symbol is removed into the end portion of the queue, and, if it is determined in said determination step that the control symbol is not included in the conflict resolution rule extracted in said extraction step, evaluates the conflict resolution rule extracted in said extraction step after all status variables to have described therein the delay information are processed, and wherein said processing step further counts a number of times that the status variables having described therein the delay information are processed, and forcefully evaluates the conflict resolution rule extracted in said extraction step when a count value exceeds a predetermined number.

9. A computer program embodied in a computer-readable medium, for causing a computer to execute an image processing method comprising:

a print setting display step of displaying a plurality of print settings on a print setting screen;

an extraction step of extracting, from a head portion of a queue, a conflict resolution for avoiding a conflict among the print settings displayed in the print setting display;

a determination step of determining whether a predetermined control symbol is included in the conflict resolution rule extracted in said extraction step, wherein the control symbol indicates information on priority of application of the conflict resolution rule over other rules; and a processing step of, if it is determined in said determination step that the control symbol is included in the conflict resolution rule extracted in said extraction step, removing the control symbol from the conflict resolution rule and inserting the conflict resolution rule from which the control symbol is removed into an end portion of the queue, and if it is determined in said determination step that the control symbol is not included in the conflict resolution rule extracted in said extraction step, evaluating the conflict resolution rule extracted in said extraction step, wherein said processing step, if it is determined in said determination step that the control symbol is included in the conflict rule extracted in said extraction step, describes delay information in a status variable, removes the control symbol from the conflict resolution rule and inserts the conflict resolution rule from which the control symbol is removed into the end portion of the queue, and, if it is determined in said determination step that the control symbol is not included in the conflict resolution rule extracted in said extraction step, evaluates the conflict resolution rule extracted in said extraction step after all status variables having described therein the delay information are processed.

10. The program according to claim 9, further comprising an updating step of updating a user interface of a printer driver based on an evaluation result of the conflict resolution rule in said processing step.

11. The program according to claim 9, wherein the control symbol is applied to a conflict rule including a temporary status variable.

12. A computer program embodied in a computer-readable medium, for causing a computer to execute an image processing method comprising:

an extraction step of extracting a conflict resolution rule from a head portion of a queue;

a determination step of determining whether or not a predetermined control symbol is included in the conflict resolution rule extracted in said extraction step, wherein the control symbol indicates information on priority of application of the conflict resolution rule over other rules; and a processing step of, if it is determined in said determination step that the control symbol is included in the conflict resolution rule extracted in said extraction step, removing the control symbol from the conflict resolution rule and inserting the conflict resolution rule from which the control symbol is removed into an end portion of the queue, and, if it is determined in said determination step that the control symbol is not included in the conflict resolution rule extracted in said extraction step, evaluating the conflict resolution rule extracted in said extraction step, wherein said processing step, if it is determined in said determination step that the control symbol is included in the conflict rule extracted in said extraction step, describes delay information in a status variable, removes the control symbol from the conflict resolution rule and inserts the conflict resolution rule from which the control symbol is removed into the end portion of the queue, and, if it is determined in said determination step that the control symbol is not included in the conflict resolution rule extracted in said extraction step, evaluates the conflict resolution rule extracted in said extraction step after all status variables having described therein the delay information are processed, and wherein said processing step further counts a number of times that the status variables to have described therein the delay information are processed, and forcefully evaluates the conflict resolution rule extracted in said extraction step when a count value exceeds a predetermined number.

* * * * *